United States Patent Office 3,346,602
Patented Oct. 10, 1967

3,346,602
13β - ALKYL - 11 - ALKYLGONA-1,3,5(10)-TRIEN-17-ONES, ETHERS AND ESTERS THEREOF
John S. Baran, Morton Grove, Ill., assignor to G. D. Searle & Co., Chicago, Ill., a corporation of Delaware
No Drawing. Filed Jan. 12, 1967, Ser. No. 608,729
Claims priority, application Great Britain, Oct. 12, 1966, 45,594/66
8 Claims. (Cl. 260—397.45)

ABSTRACT OF THE DISCLOSURE

Hypocholesterolemic and minimally estrogenic 13β-alkyl-11-alkylgona-1,3,5(10)-trien-17-ones, ethers and esters thereof manufactured by addition of an alkyl organometallic reagent to the 11-keto group of a 3,17-bisoxygenated 13β-alkylgona-1,3,5(10)-trien-11-one followed by dehydration of the resulting 11-alkyl-11-hydroxy intermediate, reduction of the 9(11) double bond so produced and conversion of the 17-oxygenated function to a keto group. Cleavage of the 3-etherified compounds affords the corresponding 3-ols which are acylated to yield the corresponding esters.

---

This application is a continuation-in-part of my copending applications Serial No. 497,462, filed Oct. 18, 1965, now U.S. Patent 3,299,108, and Serial No. 512,539, filed Dec. 8, 1965.

The present invention is concerned with novel 11-alkylated steroidal derivatives. More particularly, it relates to 13β-alkyl-11-alkylgona-1,3,5(10)-trien-17-ones, ethers and esters thereof which are structurally represented by the following formula

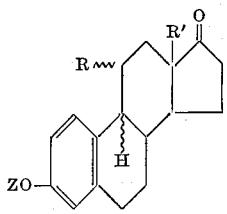

In that structural representation, R and R' denote lower alkyl radicals and Z can be hydrogen or a lower alkyl or lower alkanoyl radical.

Typical of the lower alkyl radicals denoted by R, R' and Z are methyl, ethyl, propyl, butyl, pentyl, hexyl, heptyl and the branched-chain isomers thereof.

The lower alkanoyl radicals encompassed by the Z term are exemplified by formyl, acetyl, propionyl, butyryl valeryl, caproyl, heptanoyl and the branched-chain groups isomeric therewith.

The 17-keto compounds of the present invention are suitably obtained by reduction of the 9(11) double bond of the corresponding 3-oxygenated 11,13β-dialkylgona-1,3,5(10),9(11)-tetraen-17-ones. Catalytic hydrogenation, utilizing palladium as a typical catalyst, results in the isomers wherein the stereochemical configuration of the hydrogen atoms at carbon atoms 9 and 11 is cis, while the use of an alkali metal-liquid ammonia-aniline combbination affords those isomers wherein the stereochemical configuration of the hydrogen atoms at carbon atoms 9 and 11 is trans. 3 - methoxy-11-methylestra-1,3,5(10), 9(11)-tetraen-17-one, for example, thus affords 3-methoxy-11β-methylestra-1,3,5(10)-trien-17-one and 3-methoxy - 11α-methyl-9β-estra-1,3,5(10)-trien-17-one when contacted with hydrogen and 10% palladium-on-carbon catalyst, but yields 3-methoxy-11α-methylestra-1,3,5(10)-trien-17-one and 3-methoxy-11β-methyl-9β-estra-1,3,5 (10)-trien-17-one when allowed to react with lithium in liquid ammonia containing aniline.

The aforementioned 3-oxygenated-11,13-dialkylgona-1,3,5(10),9(11)-tetraen-17-one starting materials and methods for their manufacture are disclosed in my copending application Serial No. 497,462, filed Oct. 18, 1965.

Cleavage of the 3-ether function of the instant compounds results in the corresponding 3-hydroxy substances. The reaction of 3-methoxy-11β-methylestra-1,3,5(10)-trien-17-one with hydriodic acid and acetic anhydride affords 3-hydroxy-11β-methylestra-1,3,5(10)-trien-17-one while 3-benzyloxy-11-methylestra-1,3,5(10),9(11)-tetraen-17-one yields 3-hydroxy-11β-methylestra-1,3,5(10)-trien-17-one and 3-hydroxy-11 α-methyl-9β-estra-1,3,5 (10)-trien-17-one when contacted with hydrogen in the presence of 10% palladium-on-carbon catalyst.

The instant 3-(lower alkanoyl)oxy derivatives are produced by acylation of the aforementioned 3-hydroxy compounds with a lower alkanoic acid anhydride or halide typically in the presence of a suitable acid acceptor. Acylation of 3-hydroxy-11β-methylestra-1,3,5(10)-trien-17-one with acetic anhydride in the presence of pyridine thus affords 3-acetoxy-11β-methylestra-1,3,5(10)-trien-17-one.

The compounds of this invention wherein the 13-alkyl group contains more than one carbon atom are isolated as the dl mixtures. Resolution of these dl mixtures to afford the individual d and l enantiomorphs is conveniently effected by esterification of an hydroxy group with a dibasic acid anhydride such as succinic or phthalic anhydride to afford the corresponding acid ester which is resolved by means of an optically active amine such as brucine, morphine, quinine, quinidine, strychnine, etc.

The compounds of the present invention are useful as a result of their valuable pharmacological properties. They exhibit hypocholesterolemic activity, for example, and possess the particular advantage of minimal estrogenic side effects.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight unless otherwise noted.

Example 1

A mixture of 23 parts of androsta-1,4-diene-3,11,17-trione, approximately 17 parts of ethylene glycol, 2 parts of p-toluenesulfonic acid monohydrate and 1800 parts of benzene is heated at the reflux temperature with stirring for about 2 hours, during which time the water of reaction is continuously removed. The reaction mixture is then cooled, washed successively with aqueous sodium carbonate and water, dried over anhydrous magnesium sulfate and stripped of solvent by distillation under reduced pressure. Trituration of the resulting residue with ether affords androsta-1,4-diene-3,11,17-trione 17-ethylene ketal, melting at about 213–215°.

A solution of 5 parts of androsta-1,4-diene-3,11-17-trione 17-ethylene ketal and 10 parts of lithium tri-tertiary-butoxy) aluminum hydride in 180 parts of tetrahydrofuran is stirred at room temperature for about 18 hours. At the end of that reaction period, there is added succesively 180 parts of tetrahydrofuran, 70 parts of ether, one part of water, one part of 20% aqueous sodium hydroxide and 5 parts of water. After standing at room temperature for about 10 minutes, the precipitated solids are removed by filtration and washed on the filter with chloroform. The resulting filtrate is dried over anhydrous magnesium sulfate, then is concentrated to dryness under reduced pressure. Trituration of that residue with ether affords, colorless crystals of 11-β-hydroxyandrosta-1,4-diene-3,17-dione 17-ethylene ketal, melting at about 175–185°.

To a mixture of approximately 42 parts of a 30% dispersion of lithium in paraffin, 125 parts of biphenyl, approximately 69 parts of diphenylmethane, and 1080 parts of tetrahydrofuran is added, with vigorous stirring at the reflux temperature over a period of about 30 minutes, a hot solution of 100 parts of 11β-hydroxyandrosta-1,4-diene-3,17-dione 17-ethylene ketal in 756 parts of tetrahydrofuran. Heating at the reflux temperature is continued for about 10 minutes, after which time 28 parts of methanol and 80 parts of water are successively added. After the addition of 400 parts more of water, the tetrahydrofuran is distilled under reduced pressure. The resulting residual mixture is cooled to room temperature, then is diluted with approximately 700 parts of a 3:1 mixture of benzene and hexane. The layers are separated and the organic solution is washed several times with 5% aqueous potassium hydroxide. Those washings are combined with the aqueous layer, and the resulting solution is washed with hexane and is slowly added, with vigorous tirring, to a mixture of 200 parts of acetic acid, 200 parts of water and 200 parts of ice, during which time the temperature is maintained below 10°. The resulting solid precipitate is isolated by filtration, then is washed with water and dried under reduced pressure to yield 3,11β-dihydroxyestra-1,3,5(10)-trien-17-one 17-ethylene ketal which, after recrystallization from acetone-pentane, melts at about 186–191°.

A mixture containing 4 parts of 3,11β-dihydroxyestra-1,3,5(10)-trien-17-one 17-ethylene ketal, 22.8 parts of methyl iodide, 10 parts of potassium carbonate and 80 parts of methanol is heated at the reflux temperature with stirring. After approximately 30 minutes has elapsed, an additional 11.4 parts of methyl iodide is added and reflux and stirring are continued. Additional 11.4 part portions of methyl iodide are added after 90 minutes and again after 150 minutes of reaction time. After a total reaction time of 3 hours has elapsed, the mixture is diluted with water, then is stripped of solvent by distillation under reduced pressure. The crystalline crude product which separates is collected by filtration, washed on the filter with water, then dried to afford 11β-hydroxy-3-methoxy-estra-1,3,5(10)-trien-17-one 17-ethylene ketal, melting at about 124–126°, and characterized further by infrared absorption maxima at about 2.86, 6.21 and 6.33 microns.

To a solution of 1.62 parts of 11β-hydroxy-3-methoxy-estra-1,3,5(10)-trien-17-one 17-ethylene ketal in 100 parts of acetone is added, at 5–10° over a period of about 2 minutes with vigorous stirring, 1.3 parts of an aqueous solution, 8 N in chromium trioxide and 8 N in sulfuric acid. The excess reagent is then destroyed by the addition of a small quantity of isopropyl alcohol, and the resulting mixture is filtered through diatomaceous earth, then stirred with approximately 100 parts by volume of saturated sodium bicarbonate. The organic solvent is removed by distillation under reduced pressure, and the residual mixture is extracted thoroughly with chloroform. The chloroform extracts are combined, dried over anhydrous magnesium sulfate and concentrated to dryness, thus producing 3-methoxyestra-1,3,5(10)-triene-11,17-dione 17-ethylene ketal, characterized by an infrared absorption maximum at about 5.84 microns.

To a solution of 1.55 parts of 3-methoxyestra-1,3,5(10)-triene-11,17-dione 17-ethylene ketal in 45 parts of tetrahydrofuran is added, at room temperature with stirring, 15 parts by volume of 3 M methyl magnesium bromide in n-butyl ether. The resulting reaction mixture is stirred for about 3½ hours, then is diluted carefully with approximately 8 parts of methanol. Dilution of that mixture with 150 parts by volume of saturated aqueous sodium potassium tartarate followed by extraction with chloroform of the resulting mixture affords an organic solution. The aqueous layer is extracted with chloroform, and the chloroform solutions are combined, then dried over anhydrous magnesium sulfate and distilled to dryness under reduced pressure. The resulting 11-hydroxy-3-methoxy-11-methylestra-1,3,5(10)-trien-17-one 17-ethylene ketal is characterized by an infrared absorption maximum, in chloroform, at about 2.76 microns.

To a solution of 1.35 parts of 11-hydroxy-3-methoxy-11-methylestra-1,3,5(10)-trien-17-one 17-ethylene ketal in 12 parts of pyridine is added, at −15° with stirring, one part of thionyl chloride. The resulting reaction mixture is stirred at that temperature for about 10 minutes, then is allowed to warm to approximately 0°. Approximately 50 parts of ice is then added in order to decompose the excess reagent, following which time 100 parts by volume of 4 N hydrochloric acid and approximately 150 parts of chloroform are successively added with stirring. Stirring is continued for about 10 minutes, following which time the layers are separated and the aqueous solution is washed with a fresh portion of chloroform. The chloroform extracts are then combined, washed successively with water and aqueous sodium bicarbonate, dried over anhydrous magnesium sulfate and stripped of solvent under reduced pressure. The resulting oily product is 3-methoxy-11-methylestra-1,3,5(10),9(11)-tetraen-17-one 17-ethylene ketal, which is characterized by infrared absorption maxima, in chloroform, at about 6.21 and 6.38 microns and also by nuclear magnetic resonance peaks, in chloroform, at about 115, 55, 227 and 236 cycles per second.

To a warm solution of 1.3 parts of 3-methoxy-11-methylestra-1,3,5(10),9(11)-tetraen-17-one 17-ethylene ketal in approximately 24 parts of methanol, water is added until the solution is just cloudy. That solution is clarified by the addition of a minimum quantity of methyl alcohol, following which time 1.5 parts by volume of 4 N hydrochloric acid is added. The resulting reaction mixture is heated on the steam bath for about 40 minutes, then is concentrated to dryness under reduced pressure. The residual material is extracted with chloroform, and the chloroform layer is separated, washed with saturated aqueous sodium bicarbonate, dried over anhydrous magnesium sulfate and distilled to dryness under reduced pressure. The resulting oily crude product is purified by adsorption on a silica gel chromatographic column followed by elution with 2% ethyl acetate in benzene. That eluted fraction is further purified by trituration with ether and hexane to afford 3-methoxy-11-methylestra-1,3,5(10), 9(11)-tetraen-17-one, melting at about 88°, and characterized also by infrared absorption maxima at about 5.72, 6.21 and 6.35 microns and by nuclear magnetic resonance peaks at about 227, 115 and 55 cycles per second. This compound exhibits an optical rotation, in chloroform, of +38.5°.

To a solution 5 parts of 3-methoxy-11-methylestra-1,3,5(10),9(11)-tetraen-17-one in 200 parts of methanol is added 0.5 part of 10% palladium-on-carbon catalyst, and that mixture is shaken with hydrogen at atmospheric pressure and room temperature until one molecular equivalent of hydrogen is absorbed. The reaction mixture is then filtered in order to remove the catalyst, and the filtrate is concentrated to a small volume by distillation under reduced pressure. The crystalline material which separates is collected by filtration and dried to afford 3-methoxy-11β-methylestra-1,3,5(10)-trien-17-one, melting at about 150°, and characterized further by ultraviolet absorption maxima at about 279–280 and 288 millimicrons with molecular extinction coefficients of about 2,055 and 1,940, respectively. It exhibits also nuclear magnetic resonance peaks at about 50, 57, 61 and 224 cycles per second. This compound is represented by the following structural formula

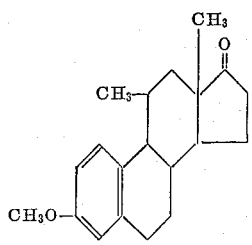

Additional crystalline material obtained from the concentrated solution is isolated by filtration and dried to afford the crude product melting at about 105–115°. This material is purified further by chromatography on silica gel followed by elution with one percent ethyl acetate in benzene and recrystallization of the resulting fraction from ether and hexane to afford 3-methoxy-11α-methyl-9β-estra-1,3,5(10)-trien-17-one, melting at about 126–127°. This substance is further characterized by nuclear magnetic resonance maxima at about 61, 75, 83 and 227 cycles per second and by the following structural formula

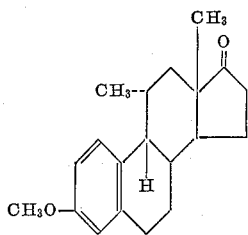

Example 2

To a mixture containing 280 parts of liquid ammonia, 25 parts of aniline and 155 parts of tetrahydrofuran is added, with stirring, a solution of 3 parts of 3-methoxy-11-methylestra-1,3,5(10),9(11)-tetraen-17-one in 54 parts of tetrahydrofuran. Approximately 1.5 parts of lithium metal is then added and the resulting reaction mixture is stirred for about 2 hours, following which time solid ammonium chloride is added in order to destroy the excess reagent. Careful distillation of that mixture to dryness under reduced pressure affords a residue, which is extracted into benzene. The benzene layer is separated, washed successively with dilute hydrochloric acid, water and dilute aqueous sodium bicarbonate, then dried over anhydrous magnesium sulfate and stripped of solvent under reduced pressure to afford a residue containing 3-methoxy-11α-methylestra-1,3,5(10)-trien-17β-ol and 3-methoxy-11β-methyl-9β-estra-1,3,5(10)-trien-17β-ol. That mixture is characterized by nuclear magnetic resonance peaks at about 43, 52, 56, 66, 73 and 86 cycles per second.

To a solution of that mixture in approximately 80 parts of acetone is added, with stirring over a period of several minutes, 3 parts by volume of an aqueous solution, 8 N in chromium trioxide and 8 N in sulfuric acid. At the end of that time, 4 parts of isopropyl alcohol followed by 100 parts of water, 50 parts of saturated aqueous sodium bicarbonate and 300 parts of chloroform are successively added. The resulting mixture is shaken, and the aqueous layer is separated and extracted with chloroform. The chloroform extracts are combined, filtered, dried over anhydrous magnesium sulfate and concentrated to dryness by distillation under reduced pressure. The resulting residue is purified by chromatography on a silica gel chromatographic column followed by elution with 1% ethyl acetate in benzene. The eluted fraction is further purified by recrystallization from methylene chloride-methanol to yield 3-methoxy-11α-methylestra-1,3,5(10)-trien-17-one, melting at about 128–130°. It exhibits nuclear magnetic resonance maxima at about 51, 69 and 75 cycles per second.

From the mother liquors of the latter methylene chloride-methanol recrystallization there is obtained 3-methoxy-11β-methyl-9β-estra-1,3,5(10)-trien-17-one.

Example 3

To a refluxing mixture of 30 parts of 47% hydriodic acid with 70 parts of acetic anhydride is added, with stirring, one part of 3-methoxy-11β-methylestra-1,3,5(10)-trien-17-one, and refluxing is continued for about 4 minutes. The reaction mixture is then cooled rapidly in an ice bath and added dropwise, with vigorous stirring, to a mixture of ice and water. The precipitated crude product is collected by filtration and dried. Purification is effected by stirring with a mixture of 5% aqueous potassium hydroxide and ether. The alkaline layer is separated and acidified by the addition of hydrochloric acid, and the precipitate which forms is collected by filtration, washed on the filter with water and dried to produce 3-hydroxy-11β-methylestra-1,3,5(10)trien-17-one, melting at about 275–280° and exhibiting, in a potassium bromide disc, infrared absorption maxima at about 3.03, 3.42, 5.80, 6.18 and 6.32 microns. This compound is represented by the following structural formula

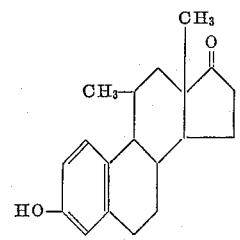

Example 4

When an equivalent quantity of benzyl chloride is substituted for methyl iodide in the alkylation procedure of Example 1 there is produced 3-benzyloxy-11β-hydroxyestra-1,3,5(10)-trien-17-one 17-ethylene ketal.

The oxidation of an equivalent quantity of 3-benzyloxy-11β-hydroxyestra-1,3,5(10)-trien-17-one 17-ethylene ketal by the procedure described in Example 1 affords 3-benzyloxyestra-1,3,5(10)-trien-11,17 - dione 17-ethylene ketal.

When an equivalent quantity of 3-benzyloxyestra-1,3,5(10)-trien-11,17-dione 17-ethylene ketal is substituted in the procedure of Example 1, there is obtained 3-benzyloxy-11-hydroxy-11-methylestra-1,3,5(10)-trien-17-one 17-ethylene ketal.

By substituting an equivalent quantity of 3-benzyloxy-11-hydroxy-11-methylestra-1,3,5(10)-trien-17-one 17-ethylene ketal and otherwise proceeding according to the process described in Example 1, there is obtained 3-benzyloxy-11-methylestra - 1,3,5(10),9(11) - tetraen-17-one 17-ethylene ketal.

The substitution of an equivalent quantity of 3-benzyloxy-11-methylestra-1,3,5(10),9(11)-tetraen-17-one 17-ethylene ketal in the procedure of Example 1 results in 3-benzyloxy-11-methylestra - 1,3,5(10),9(11)-tatraen-17-one, melting at about 169–170°.

When an equivalent quantity of 3-benzyloxy-11-methylestra-1,3,5(10),9(11)-tetraen-17-one is substituted in the hydrogenation procedure of Example 1, there is obtained 3-hydroxy-11β-methylestra-1,3,5(10)-trien-17-one, melting at about 275–280° and 3-hydroxy-11α-methyl-9β-estra-1,3,5(10)-trien-17-one.

Example 5

To a solution of 4.5 parts of dl-13β-ethyl-3-methoxy-gona-1,3,5(10),9(11)-tetraen-17β-ol in 300 parts of chloroform is added, with stirring, a solution of 3 parts of m-chloroperbenzoic acid in 75 parts of chloroform. The resulting reaction mixture is stirred for about 45 minutes, then is diluted with approximately 200 parts by volume of an aqueous solution containing 15 parts of sodium sulfite. Stirring is continued for about 10 minutes following which time the chloroform layer is separated, dried over anhydrous magnesium sulfate and distilled to dryness under reduced pressure. The resulting amorphous solid crude product is purified by adsorption on a silica gel chromatographic column followed by elution with 20% ethyl acetate in benzene, thus producing dl-13β-ethyl-17β-hydroxy-3-methoxygona - 1,3,5(10)-trien - 11-one, which is characterized by ultraviolet absorption maxima at about 275 and 280 millimicrons and also by infrared absorption maxima at about 2.76 and 5.82 microns.

To a solution of 3 parts of dl-13β-ethyl-17β hydroxy-3-methoxygona-1,3,5(10)-trien-11-one in 44 parts of benzene is added 50 parts by volume of a 1.7 M methyl lithium in ether solution. After the addition is complete the resulting mixture is concentrated to approximately ½ volume of distilling then is heated at the reflux temperature for about 4 hours. Cooling of the mixture followed by the dropwise addition of aqueous ammonium chloride until cessation of the evolution of gas affords a mixture which is further diluted by the addition of 100 parts by volume of aqueous ammonium chloride. That mixture is then stirred with ether, and the ether layer is separated, dried over anhydrous magnesium sulfate and concentrated to dryness under reduced pressure to afford 13β-ethyl-3-methoxy-11-methylgona-1,3,5(10)-triene-11,17β - diol, exhibiting infared absorption maxima, in chloroform, at about 2.75 and 2.88 microns.

To a solution of one part of dl-13β-ethyl-3-methoxy-11-methylgona-1,3,5(10)-triene-11,17β-diol in 40 parts of acetone is added one part by volume of an aqueous solution, 8 N in chromium troxide and 8 N sulfuric acid, and that mixture is stirred for about 3 minutes. A small quantity of isopropyl alcohol is added in order to destroy the excess oxidant, and the resulting mixture is concentrated to a small volume, then diluted with water and neutralized by the addition of saturated aqueous sodium bicarbonate. Extraction of that neutralized mixture with ether affords a solution, which is dried over anhydrous magnesium sulfate and distilled to dryness to afford a residual oil consisting of a mixture of dl-13β-ethyl-3-methoxy-11-methyl-11-hydroxygona-1,3,5(10) - trien - 17-one and dl - 13β - ethyl - 3 - methoxy - 11 - methylgona-1,3,5(10),9(11)-tetraen-17-one.

The latter mixture is dissolved in 5 parts of pyridine, then is cooled in an ice bath while 0.8 part of thionyl chloride is added dropwise with stirring. The resulting reaction mixture is allowed to stand for approximately one minute, then is diluted with ice and water. Acidification of the mixture with dilute hydrochloric acid followed by extraction with ether affords an organic layer, which is washed with aqueous sodium bicarbonate, dried over anhydrous magnesium sulfate and distilled to dryness under reduced pressure, thus affording dl - 13β - ethyl-3-methoxy-11-methylgona-1,3,5(10), 9(11)-tetraen-17-one.

When an equivalent quantity of dl-13β-ethyl-3-methoxy-11-methylgona-1,3,5(10),9(11)-tetraen-17-one is hydrogenated by the procedure of Example 1, there is obtained dl-13β-ethyl-3-methoxy-11β-methylgona-1,3,5(10) - trien-17-one.

Example 6

A mixture of 4 parts of 3-methoxyestra-1,3,5(10)-triene-11,17-dione 17-ethylene ketal, 10 parts of the 30% lithium acetylide-70% ethylene diamine complex and 225 parts of tetrahydrofuran is stirred in a nitrogen atmosphere at 0–5° for about 2½ hours, then is diluted carefully with water. The resulting aqueous solution is concentrated to a small volume under nitrogen, and the residual mixture is extracted with benzene. The benzene layer is separated, dried over anhydrous magnesium sulfate, then distilled to dryness under reduced pressure to afford 11-ethynyl-11-hydroxy-3-methoxyestra-1,3,5(10) - trien - 17-one 17-ethylene ketal.

To a solution of 3.68 parts of 11-ethynyl-11-hydroxy-3-methoxyestra-1,3,5(10)-trien-17-one 17-ethylene ketal in 400 parts of methanol is added 0.5 part of 5% palladium-on-carbon catalyst, and the resulting mixture is shaken with hydrogen at room temperature and atmospheric pressure until two molecular equivalents of hydrogen have been absorbed. Removal of the catalyst by filtration affords an organic solution which is concentrated to dryness under reduced pressure, thus affording 11-ethyl-11-hydroxy-3-methoxyestra-1,3,5-(10)-trien-17-one 17-ethylene ketal.

The dehydration with thionyl chloride of 11-ethyl-11-hydroxy-3-methoxyestra-1,3,5(10)-trien-17-one 17-ethylene ketal according to the procedure described in Example 1 results in 11-ethyl-3-methoxyestra-1,3,5(10),9(11)-tetraen-17-one 17-ethylene ketal.

The hydrolysis of an equivalent quantity of 11-ethyl-3-methoxyestra-1,3,5(10),9(11)-tetraen-17-one 17-ethylene ketal by the procedure described in Example 1 results in 11-ethyl-3-methoxyestra-1,3,5(10),9(11)-tetraen-17-one.

When an equivalent quantity of 11-ethyl-3-methoxyestra-1,3,5(10),9(11)-tetraen-17-one is hydrogenated by the procedure described in Example 1, there is produced 11β-ethyl-3-methoxyestra-1,3,5(10)-trien-17-one.

Example 7

When 3,11β-dihydroxyestra-1,3,5(10)-trien-17-one 17-ethylene ketal is allowed to react with an equivalent quantity of ethyl iodide by the procedure described in Example 1, there is produced 3-ethoxy-11β-hydroxyestra-1,3,5(10)-trien-17-one 17-ethylene ketal.

When an equivalent quantity of 3-ethoxy-11β-hydroxyestra-1,3,5(10)-trien-17-one 17-ethylene ketal is subjected to the successive processes described in Example 1, there is obtained 3 - ethoxy-11-methylestra - 1,3,5(10),9(11)-tetraen-17-one.

The substitution of an equivalent quantity of 3-ethoxy-11-methylestra-1,3,5(10),9(11)-tetraen-17-one in the procedure described in Example 1 results in 3-ethoxy-11β-methylestra-1,3,5(10)-trien-17-one.

Example 8

A mixture containing 1 part of 3-hydroxy-11β-methylestra-1,3,5(10)-trien-17-one, 5 parts of acetic anhydride and 10 parts of pyridine is allowed to stand at room temperature for about 2 hours, then is cooled to approximately 0° and carefully diluted with water. The crystalline precipitate which forms is collected by filtration and dried to yield 3-acetoxy-11β-methylestra-1,3,5(10)-trien-17-one, which displays an infrared absorption maximum in chloroform, at about 5.65–5.75 microns.

Example 9

When an equivalent quantity of propionic anhydride is substituted in the procedure of Example 8, there is obtained 11β-methyl - 3-propionoxyestra-1,3,5(10)-trien-17-one.

Example 10

A solution of 5 parts of the mixture of dl-13β-ethyl-3-methoxy-11-methyl-11-hydroxygona - 1,3,5(10) - trien-17-one and dl-13β-ethyl-3-methoxy-11-methylgona-1,3,5 (10),9(11)-tetraen-17-one, obtained by the procedure described in Example 5, in 40 parts of methanol containing 12 parts of concentrated hydrochloric acid is distilled slowly over a period of about 45 minutes. The residual mixture is cooled, neutralized by the addition of aqueous sodium bicarbonate, then extracted with benzene. This organic extract is dried over anhydrous magnesium sulfate, then concentrated to dryness under reduced pressure to afford dl-13β-ethyl-3-methoxy - 11 - methylgona-1,3,5 (10),9(11)-tetraen-17-one.

What is claimed is:

1. A compound of the formula

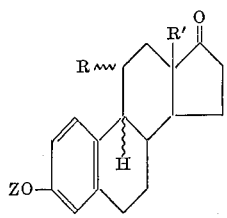

wherein R and R' are lower alkyl radicals and Z is selected from the group consisting of hydrogen, a lower alkyl and a lower alkanoyl radical.

2. As in claim 1, a compound of the formula

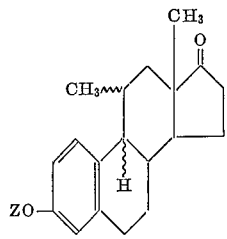

wherein Z is selected from the group consisting of hydrogen, a lower alkyl and a lower alkanoyl radical.

3. As in claim 1, a compound of the formula

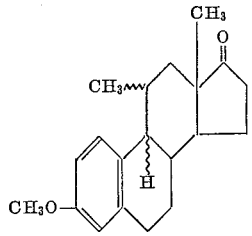

4. As in claim 1, a compound of the formula

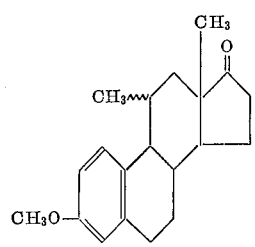

5. As in claim 1, the compound which is 3-methoxy 11β-methylestra-1,3,5(10)-trien-17-one.
6. As in claim 1, the compound which is 3-methoxy 11α-methylestra-1,3,5(10)-trien-17-one.
7. As in claim 1, the compound which is 3-methoxy 11α-methyl-9β-estra-1,3,5(10)-trien-17-one.
8. As in claim 1, the compound which is 3-hydroxy 11β-methylestra-1,3,5(10)-trien-17-one.

References Cited

UNITED STATES PATENTS 3,207,753  9/1965  Bowers et al. _____ 260—239.5

OTHER REFERENCES

Cooper, Chem. Abs., 53:5492b (1959).
Ercoli et al.: Endocrinology, 71, 593–597 (1962).
Zderic et al.: J. Amer. Chem. Soc., 82, 3404–340 (1960).

LEWIS GOTTS, Primary Examiner.

T. M. MESHBESHER, Assistant Examiner.